(12) United States Patent
Nagawatari

(10) Patent No.: US 12,135,229 B2
(45) Date of Patent: Nov. 5, 2024

(54) AIRFLOW MEASUREMENT SYSTEM INCLUDING A COMMUNICATION MODULE GROUP

(71) Applicant: MINEBEA MITSUMI Inc., Nagano (JP)

(72) Inventor: Minoru Nagawatari, Tokyo (JP)

(73) Assignee: MINEBEA MITSUMI Inc., Nagano (JP)

( * ) Notice: Subject to any disclaimer, the term of this patent is extended or adjusted under 35 U.S.C. 154(b) by 340 days.

(21) Appl. No.: 17/635,456

(22) PCT Filed: Jul. 20, 2020

(86) PCT No.: PCT/JP2020/028010
§ 371 (c)(1),
(2) Date: Feb. 15, 2022

(87) PCT Pub. No.: WO2021/033475
PCT Pub. Date: Feb. 25, 2021

(65) Prior Publication Data
US 2022/0291030 A1 Sep. 15, 2022

(30) Foreign Application Priority Data
Aug. 21, 2019 (JP) .................. 2019-150833

(51) Int. Cl.
*G01F 1/76* (2006.01)
(52) U.S. Cl.
CPC ..................... *G01F 1/76* (2013.01)

(58) Field of Classification Search
None
See application file for complete search history.

(56) References Cited

U.S. PATENT DOCUMENTS

| 9,927,271 B2 * | 3/2018 | Hansen | G01F 1/662 |
| 10,605,189 B2 * | 3/2020 | Kohno | G01F 5/00 |
| 11,237,033 B2 * | 2/2022 | Mikkonen | G01N 29/024 |

(Continued)

FOREIGN PATENT DOCUMENTS

| JP | 2001-264180 | 9/2001 |
| JP | 2005-003313 | 1/2005 |

(Continued)

OTHER PUBLICATIONS

Office Action mailed on Aug. 1, 2023 with respect to the corresponding Japanese patent application No. 2021-540675.

(Continued)

*Primary Examiner* — Peter J Macchiarolo
*Assistant Examiner* — Jermaine L Jenkins
(74) *Attorney, Agent, or Firm* — IPUSA, PLLC

(57) ABSTRACT

An airflow measurement system includes a plurality of communication modules and an information processing apparatus. The communication module includes an airflow sensor, and a body portion including a communication unit configured to acquire data output from the airflow sensor and transmit the data to outside by wireless communication. The information processing apparatus includes a data collection unit configured to collect the data output from the airflow sensor of the plurality of communication modules, and an output unit configured to output the collected data.

9 Claims, 17 Drawing Sheets

(56) References Cited

U.S. PATENT DOCUMENTS

| | | |
|---|---|---|
| 11,385,096 B2 * | 7/2022 | Ivanov ..................... G01F 1/28 |
| 2012/0303166 A1 | 11/2012 | Chang |
| 2017/0188486 A1 * | 6/2017 | VanGilder ................. G01F 1/69 |
| 2019/0017717 A1 * | 1/2019 | Urbaniak ................. F24F 11/30 |
| 2019/0128550 A1 | 5/2019 | Campos |
| 2020/0290410 A1 * | 9/2020 | Davenport .......... B60C 23/0472 |

FOREIGN PATENT DOCUMENTS

| | | |
|---|---|---|
| JP | 2010-255898 | 11/2010 |
| JP | 2012-063055 | 3/2012 |
| JP | 2013-011460 | 1/2013 |
| JP | 2014-036273 | 2/2014 |
| JP | 2015-524910 | 8/2015 |
| JP | 2018-054528 | 4/2018 |
| JP | 2019-124494 | 7/2019 |
| WO | 2014/022593 | 2/2014 |

OTHER PUBLICATIONS

Extended European Search Report mailed on Aug. 8, 2022 with respect to the European patent application No. 20854984.0.
International Search Report for PCT/JP2020/028010 mailed on Oct. 13, 2020.
Office Action mailed on Mar. 7, 2023 with respect to the corresponding Japanese patent application No. 2021-540675.

* cited by examiner

FIG.9
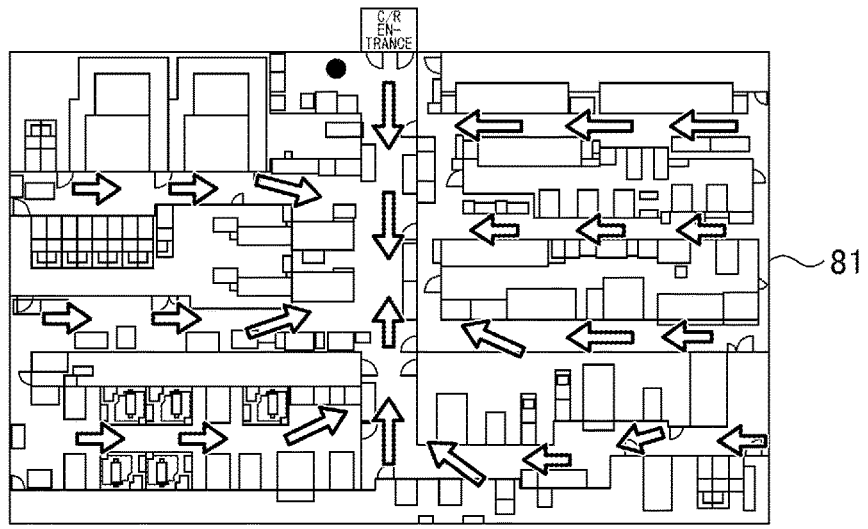
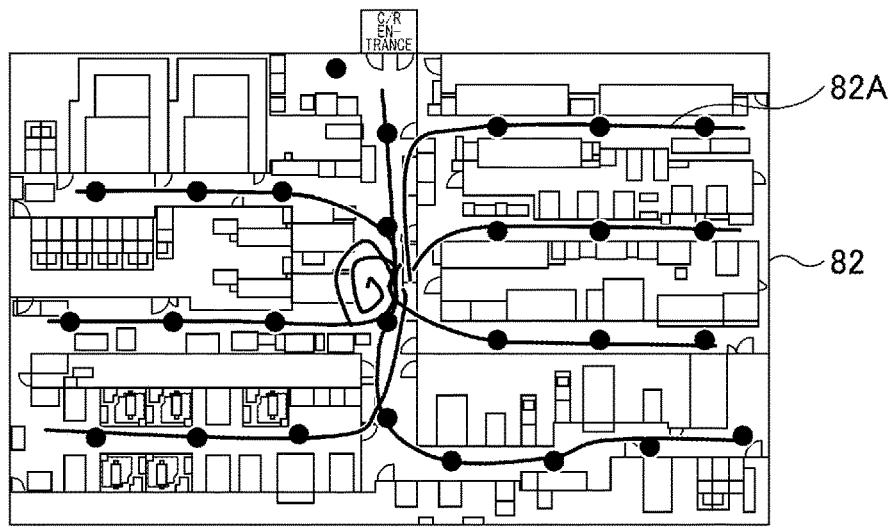
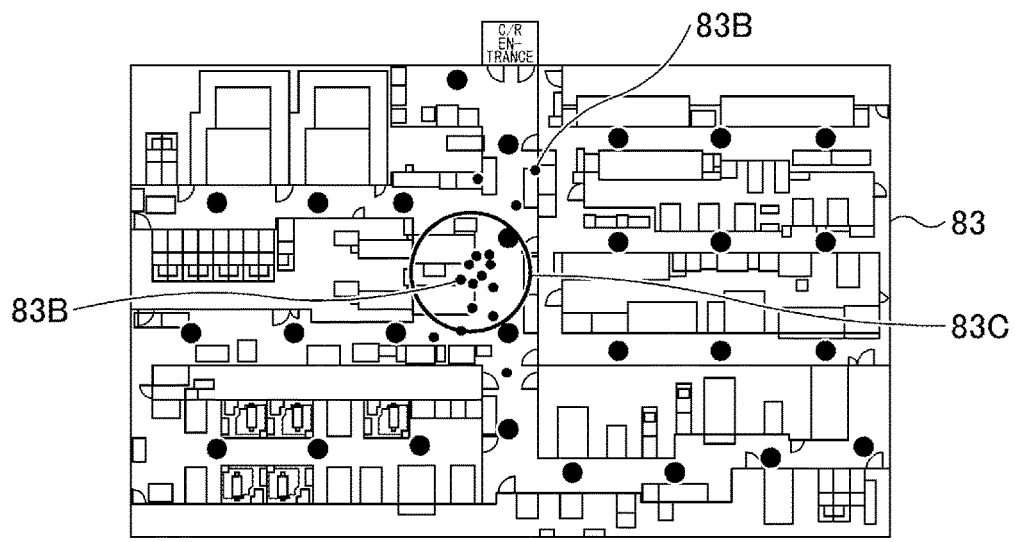

AIRFLOW MEASUREMENT SYSTEM INCLUDING A COMMUNICATION MODULE GROUP

TECHNICAL FIELD

The present invention relates to an airflow measurement system and a communication module.

BACKGROUND ART

Conventionally, a device for measuring the flow direction and flow velocity of a fluid, such as air, is known to be equipped with a sensor element. It is known that such a flow direction and velocity measuring device includes a housing for holding a substrate having a sensor element mounted thereon and a flow passage plate in which an outer peripheral portion is fixed to the housing by multiple support posts. Further, conventionally, the use of an airflow measuring device to measure the airflow in a data center is known.

RELATED-ART DOCUMENTS

Patent Documents

Patent Document 1: Japanese Patent Application Laid-Open No. 2018-54528
Patent Document 2: Japanese Patent No. 6494811

SUMMARY OF THE INVENTION

Problem to be Solved by the Invention

The above-mentioned conventional technique is complicated because it is necessary for a measurer to move the airflow measuring apparatus to an appropriate place and set the airflow measuring apparatus every time the airflow is measured.

The technique of the present disclosure has been developed in view of the above circumstances and the purpose is to easily measure the airflow.

Means to Solve the Problem

The technique of the present disclosure is related to an airflow measurement system (100) including a plurality of communication modules (200) an information processing apparatus (400). The communication module includes an airflow sensor (210), and a body portion (220) including a communication unit (222) configured to acquire data output from the airflow sensor and transmit the data to outside by wireless communication. The information processing apparatus includes a data collection unit (410) configured to collect the data output from the airflow sensor of the plurality of communication modules, and an output unit (450) configured to output the collected data.

Effects of the Invention

The airflow can be easily measured.

BRIEF DESCRIPTION OF THE DRAWINGS

FIG. 9 is a diagram illustrating an output example of a processing result of the first embodiment;

MODE FOR CARRYING OUT THE INVENTION

First Embodiment

Figure 1:
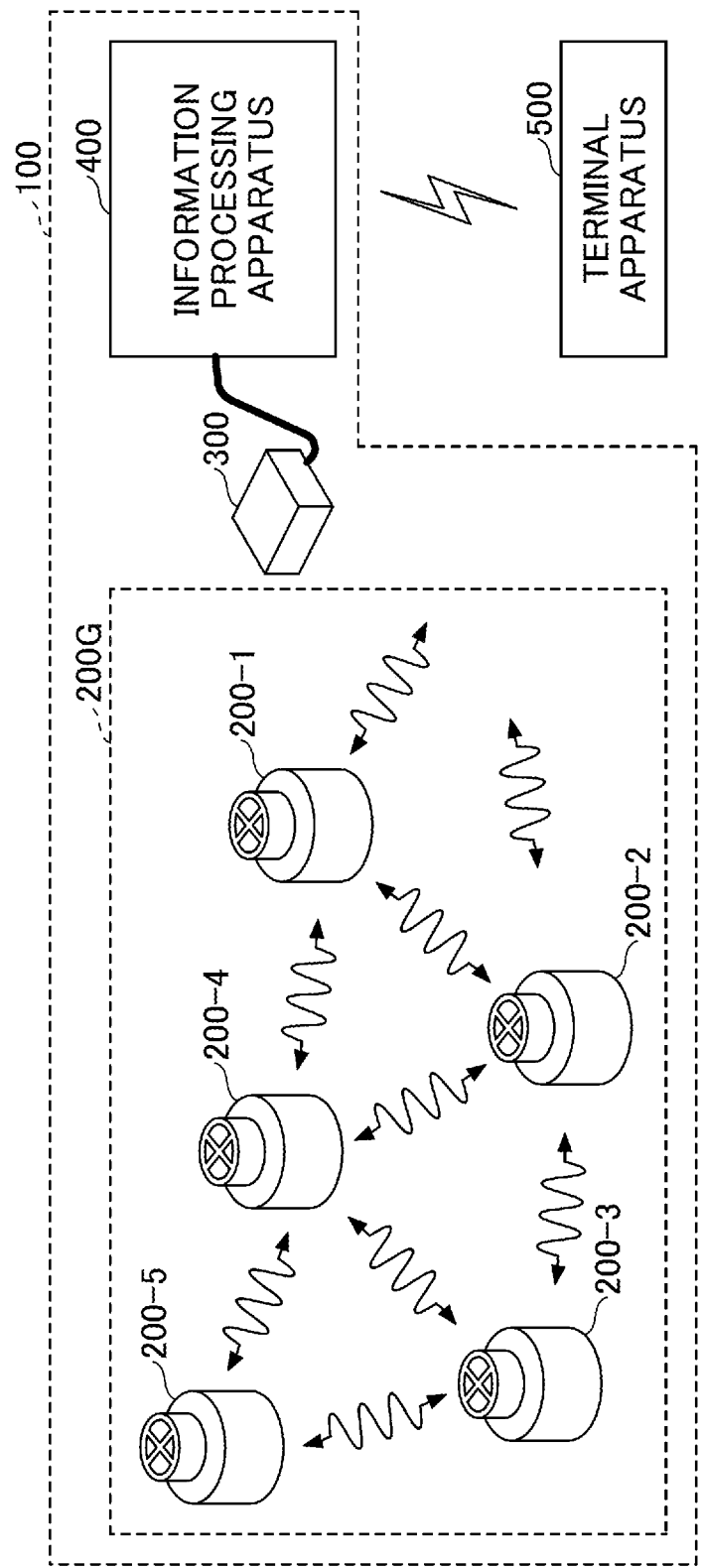
FIG. 1 is a diagram illustrating a system configuration of an airflow measurement system according to a first embodiment.

A first embodiment will be described with reference to the drawings. FIG. 1 is a diagram illustrating a system configuration of an airflow measurement system according to the first embodiment.

An airflow measurement system 100 according to the present embodiment includes a communication module group 200G, a communication terminal 300, and an information processing apparatus 400.

The communication module group 200G includes a plurality of communication modules 200-1, 200-2, • • •, 200-5. When each of the plurality of communication modules 200-1, 200-2, • • •, 200-5 is not distinguished, the communication modules are referred to as communication modules 200.

Note that, the communication module group 200G includes five communication modules 200-1, 200-2, • • •, 200-5 in FIG. 1, but the number of the communication modules 200 included in the communication module group 200G is not limited to five as illustrated in FIG. 1. The number of the communication modules 200 included in the communication module group 200G is not limited.

The communication module 200 according to the present embodiment includes an airflow sensor for detecting a wind direction or a wind velocity, and a wireless communication function for transmitting data detected by the airflow sensor to the communication terminal 300. Details of the communication module 200 will be described below.

The communication terminal 300 is an access point that relays communication between the communication module 200 and the information processing apparatus 400.

The information processing apparatus 400 collects data from the communication module group 200G through the communication terminal 300. The information processing apparatus 400 analyzes the collected data and analyzes the airflow in the space where the communication module group 200G is installed.

The information processing apparatus 400 communicates with a terminal apparatus 500 through a network or the like and outputs an analysis result to the terminal apparatus 500.

In the example of FIG. 1, the communication terminal 300 and the information processing apparatus 400 are provided separately, but the present invention is not limited to this configuration. The communication terminal 300 and the information processing apparatus 400 may be included in a single apparatus. In other words, the communication terminal 300 may be included in the information processing apparatus 400.

Figure 2:
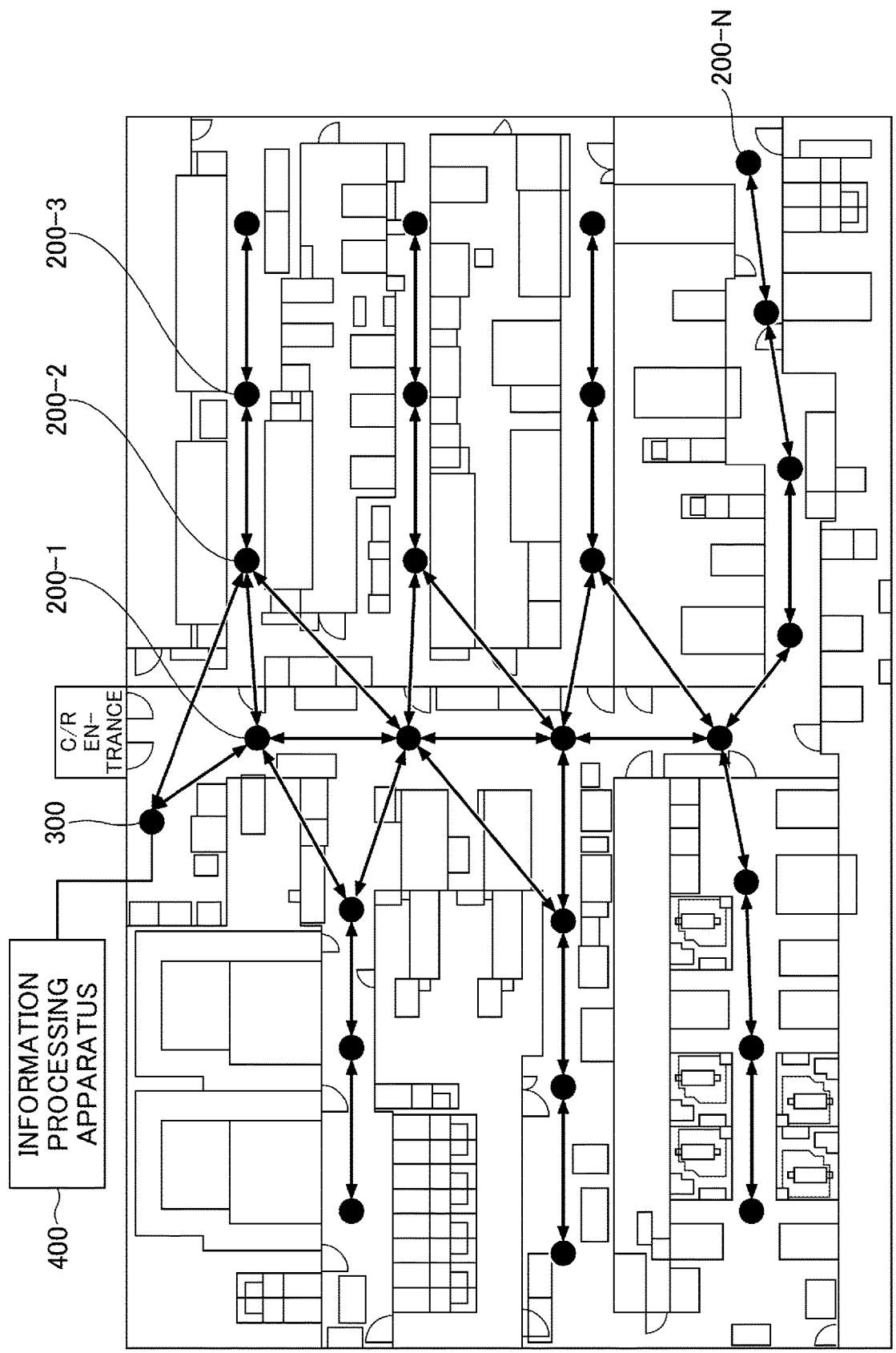
FIG. 2 is a first diagram illustrating a scenario in which the airflow measurement system is in use.

Next, a scenario in which the airflow measurement system 100 according to the present embodiment is in use will be described with reference to FIG. 2. FIG. 2 is a first diagram illustrating according to the present embodiment.

FIG. 2 is a top view of a cleanroom 2 provided in, for example, a semiconductor integrated circuit manufacturing plant. In the example of FIG. 2, a plurality of communication modules 200 are arranged in the cleanroom 2. The communication module 200 may be installed at any suitable location, and for example, the installation location may be decided by the administrator of the cleanroom 2.

The communication module 200 and the communication terminal 300 of the present embodiment communicate with each other via, for example, a mesh network using Bluetooth. Accordingly, a receiving source and a transmitting destination of the information are determined for each of the communication modules 200.

For example, when the communication module 200-1 receives a transmission request of the data detected by an airflow sensor 210 of the communication module 200-3 from the communication terminal 300, which is the receiving source of the information, the communication module 200-1 transmits the transmission request to the communication module 200-2, which is the transmitting destination of the information.

When the airflow sensor 210 of the communication module 200-3 receives the transmission request for the detected data from the communication module 200-1, which is the receiving source of the information, the communication module 200-2 transmits the transmission request to the communication module 200-3, which is the transmitting destination of the information.

The communication module 200-3 returns the data detected by the airflow sensor 210 of the communication module 200-3 to the communication module 200-2 when the airflow sensor 210 receives a transmission request of the detected data from the communication module 200-1, which is the receiving source of the information. The communication module 200-2 returns this data to the communication module 200-1, and the communication module 200-1 returns this data to the communication terminal 300.

In the present embodiment, such communication is repeated to collect data detected by the airflow sensor 210 in each communication module 200 included in the communication module group 200G.

The airflow measurement system 100 according to the present embodiment may be applied to, for example, manage the airflow in a machine manufacturing factory or management of airflow in a plant growing factory.

According to the present embodiment, the communication module 200 can monitor changes in the airflow at multiple points by being installed at any location in the space. Further, in the present embodiment, since the mesh network is used, there is no need to provide multiple access points, and even in a large factory or the like in which a shield exists, airflow at multiple points can be measured with a single system. Therefore, according to the present embodiment, the airflow measurement system 100 can be easily introduced at a low cost.

Figure 3:
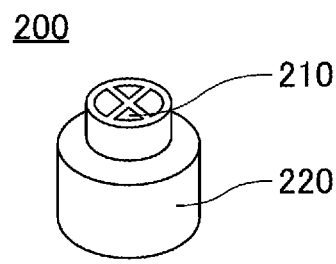
FIG. 3 is a diagram illustrating a communication module.
Figure 4:
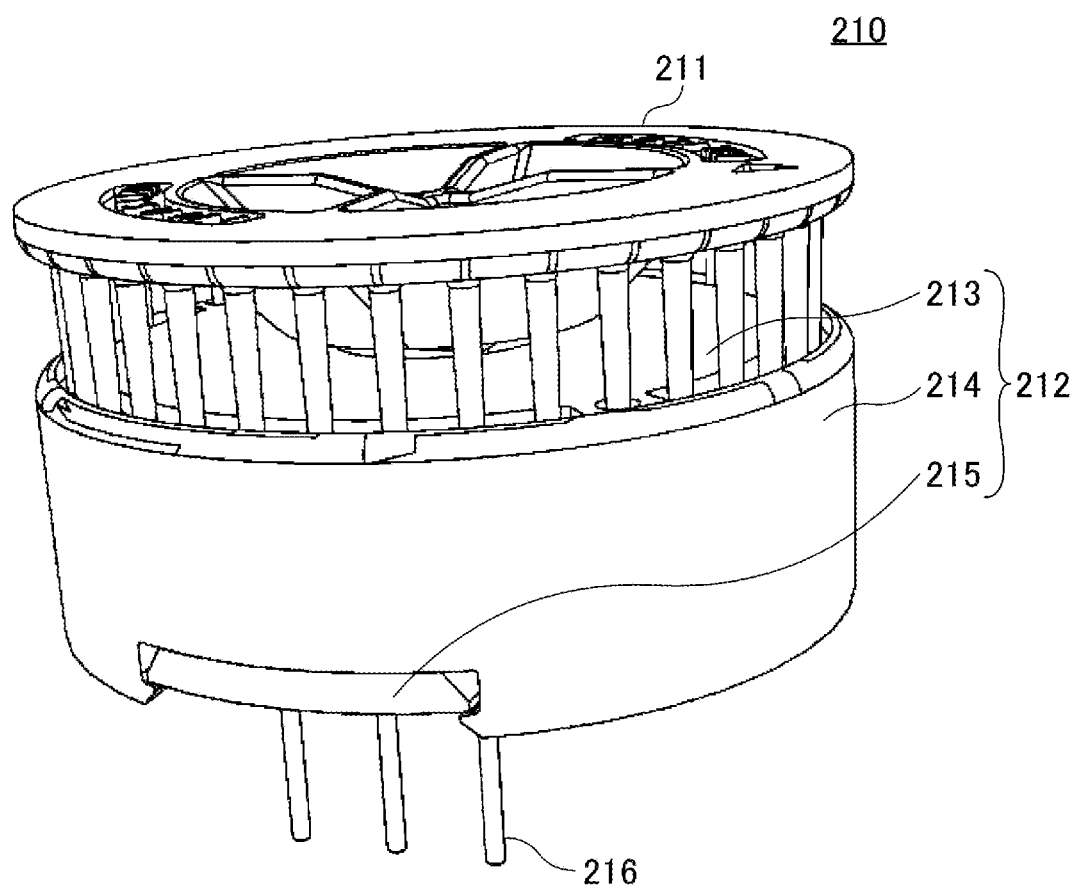
FIG. 4 is a diagram illustrating an airflow sensor.
Figure 5:
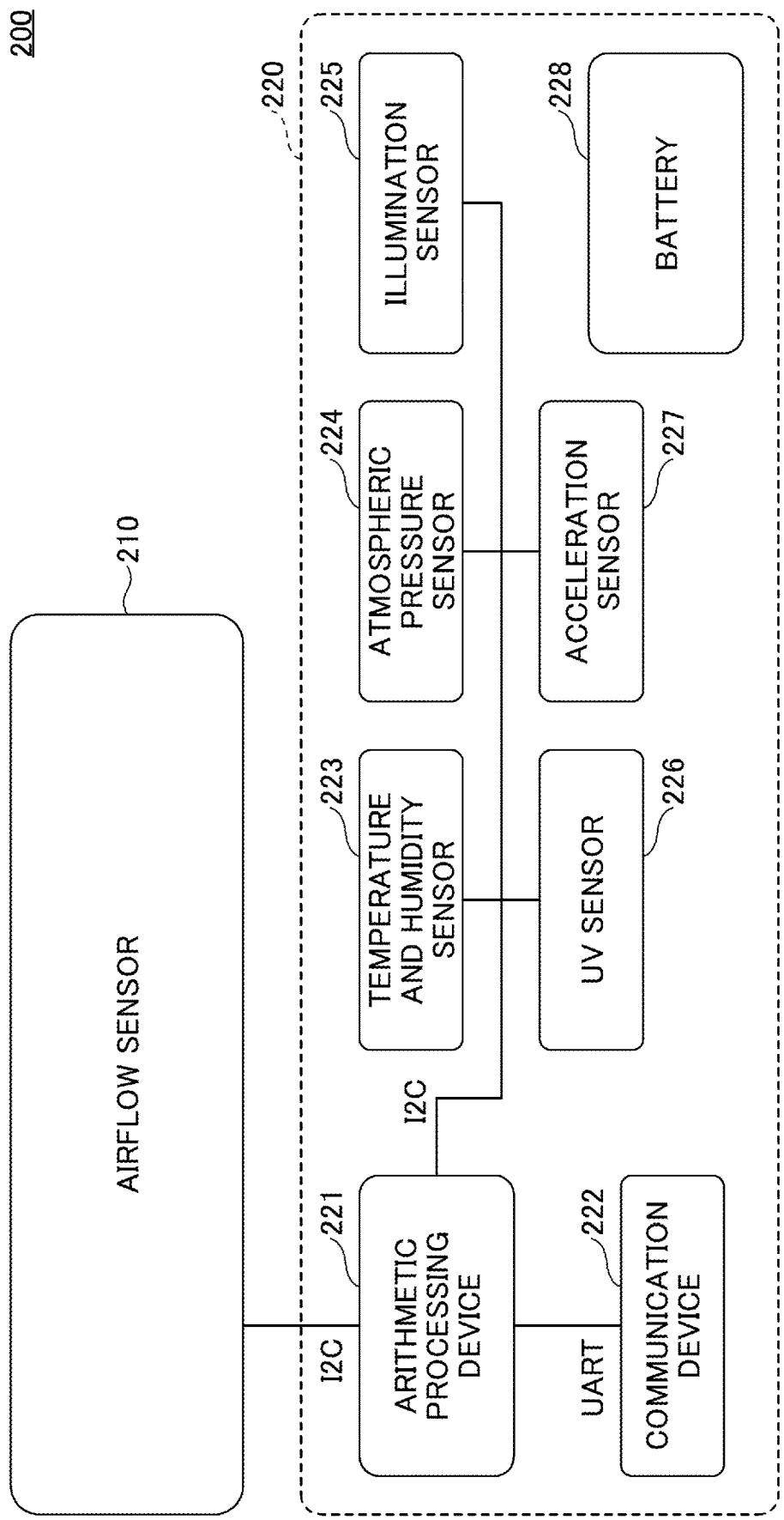
FIG. 5 is a diagram illustrating a body portion.

Next, the communication module 200 according to the present embodiment will be described with reference to FIG. 3 to FIG. 5. FIG. 3 is a diagram illustrating a communication module, FIG. 4 is a diagram illustrating an airflow sensor, and FIG. 5 is a diagram illustrating a body portion.

The communication module 200 of the present embodiment includes the airflow sensor 210 and a body portion 220.

The airflow sensor 210 is a counter flow velocity measuring device having a flow passage forming portion 211 and a housing 212. The flow passage forming portion 211 and the housing 212 are fixed in the airflow sensor 210.

The housing 212 includes an outer frame 214 which is substantially cylindrical, an annular substrate fixing portion 213 in which an opening is formed, and a bottom lid 215 which is substantially disk-shaped. The substrate fixing portion 213 extends inwardly from the upper end portion of the outer frame 214. For example, the outer frame 214 and the substrate fixing portion 213 are integrally formed. Further, a substrate fixed by the substrate fixing portion 213 is housed inside the housing 212, and a sensor element for detecting the flow direction and the flow velocity of a fluid such as air is mounted on the substrate.

The bottom lid 215 is connected to the lower end portion of the outer frame 214. A plurality of through-holes are formed in the bottom lid 215 through which an external connection terminal 216 is inserted.

The airflow sensor 210 conducts with the body portion 220 when the external connection terminal 216 is plugged into the body portion 220.

The body portion 220 of the present embodiment includes an arithmetic processing device 221, a communication device 222, a temperature and humidity sensor 223, an atmospheric pressure sensor 224, an illuminance sensor 225, an ultraviolet (UV) sensor 226, an acceleration sensor 227, and a battery 228.

The arithmetic processing device 221 is connected to the airflow sensor 210 by a serial bus and acquires data output from the airflow sensor 210. The communication device 222 communicates with a receiving source and a transmitting destination of data.

The temperature and humidity sensor 223 detects the temperature and humidity of the space where the communication module 200 is installed. The temperature and humidity may be used to control the temperature and humidity of the space where communication module 200 is installed.

The atmospheric pressure sensor 224 detects atmospheric pressure in the space where the communication module 200 is installed. The atmospheric pressure may be used, for example, for correcting the humidity affected by atmospheric pressure.

The illuminance sensor 225 detects illuminance in the space where the communication module 200 is installed. The UV sensor 226 detects the intensity of ultraviolet rays in the space where the communication module 200 is installed.

The acceleration sensor 227 detects acceleration of the communication module 200. In the present embodiment, for example, a value detected by the acceleration sensor 227 may be used to detect that the communication module 200 has dropped from the place where the communication module 200 is installed. The battery 228 is a power source that supplies power to drive communication module 200.

The body portion 220 of the present embodiment includes, the temperature and humidity sensor 223, the atmospheric pressure sensor 224, the illuminance sensor 225, the UV sensor 226, and the acceleration sensor 227, but the present invention is not limited to this configuration. The body portion 220 may include the arithmetic processing device 221, the communication device 222, and the battery 228, and may or may not include a sensor other than the airflow sensor 210. The body portion 220 according to the present embodiment may include any one or more of the temperature and humidity sensor 223, the atmospheric pressure sensor 224, the illuminance sensor 225, the UV sensor 226, and the acceleration sensor 227.

Figure 6:
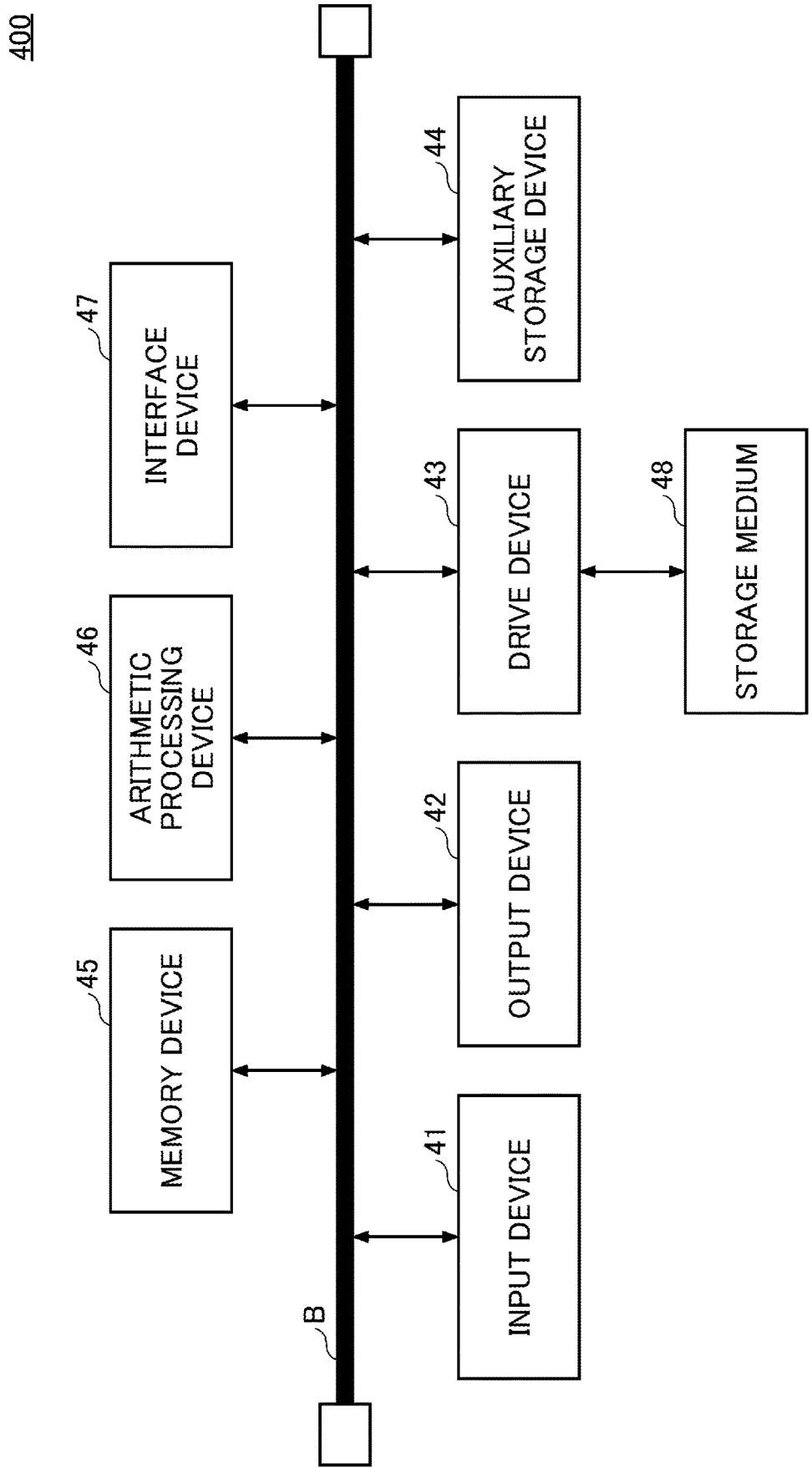
FIG. 6 is a diagram illustrating a hardware configuration of an information processing apparatus according to the first embodiment.

Next, the hardware configuration of the information processing apparatus 400 according to the present embodiment will be described with reference to FIG. 6. FIG. 6 is a diagram illustrating a hardware configuration of an information processing apparatus according to the first embodiment.

The information processing apparatus 400 according to the present embodiment is a computer including an input device 41, an output device 42, a drive device 43, an auxiliary storage device 44, a memory device 45, an arithmetic processing device 46, and an interface device 47, each of which is interconnected by a bus B.

The input device 41 is a device for inputting various kinds of information and is implemented by, for example, a keyboard or a pointing device. The output device 42 is used to output various kinds of information and is implemented by, for example, a display. The interface device 47 includes a LAN card or the like and is used to connect to the network.

An information processing program is at least a portion of various programs for controlling the information processing apparatus 400. The information processing program may be provided, for example, by a distribution of a storage medium 48 or by downloading from a network. The storage medium 48 on which the information processing program is recorded may use various types of storage media, for example, a storage media that optically, electrically or magnetically records information, such as a CD-ROM, a flexible disk, a magneto-optical disk, a semiconductor memory that electrically records information such as a ROM, a flash memory, and the like.

When the storage medium 48 in which the information processing program is recorded is set in the drive device 43, the information processing program is installed in the auxiliary storage device 44 from the storage medium 48 via the drive device 43. The information processing program downloaded from the network is installed in the auxiliary storage device 44 via the interface device 47.

The auxiliary storage device 44 implements each storage unit and the like of the information processing apparatus 400. The auxiliary storage device 44 stores the information processing program installed in the information processing apparatus 400 and stores various necessary files and data used by the information processing apparatus 400. The memory device 45 reads out the information processing program from the auxiliary storage device 44 to store at the start of the information processing apparatus 400. The arithmetic processing device 46 performs various processing as described below in accordance with the information processing program stored in the memory device 45.

Figure 7:
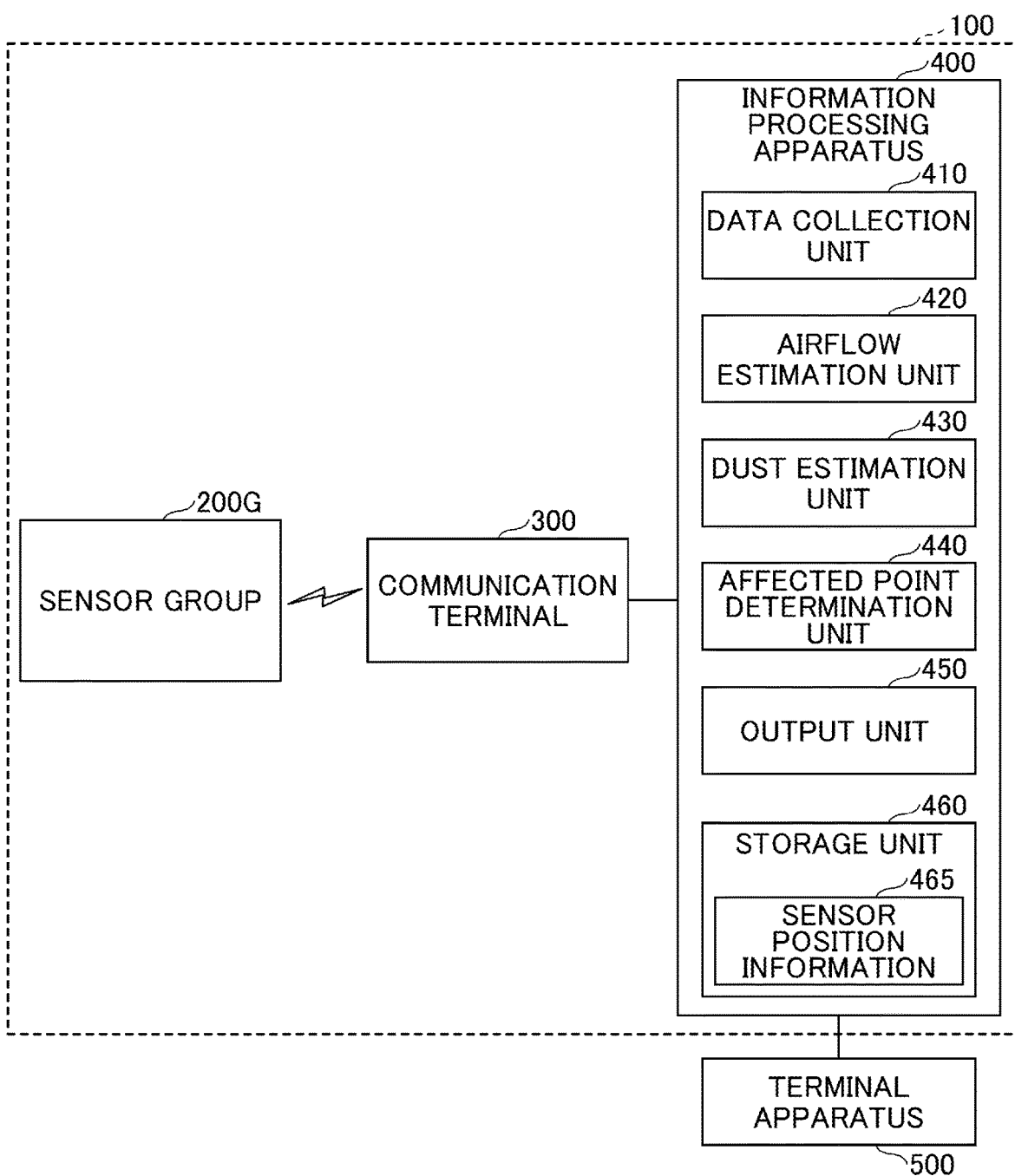
FIG. 7 is a diagram illustrating a function of the information processing apparatus according to the first embodiment.

Next, a function of the information processing apparatus 400 according to the present embodiment will be described with reference to FIG. 7. FIG. 7 is a diagram illustrating a function of the information processing apparatus according to the first embodiment.

The information processing apparatus 400 according to the present embodiment includes a data collection unit 410, an airflow estimation unit 420, a dust estimation unit 430, an affected point determination unit 440, an output unit 450, and a storage unit 460.

The data collection unit 410, the airflow estimation unit 420, the dust estimation unit 430, the affected point determination unit 440, and the output unit 450 according to the present embodiment are functions that are implemented when the arithmetic processing device 46 of the information processing apparatus 400 reads out and executes the program stored in the memory device 45. The storage unit 460 is implemented by the memory device 45, the auxiliary storage device 44, or the like.

The data collection unit 410 collects data output from each communication module 200 included in the communication module group 200G when the communication terminal 300 receives the data.

The airflow estimation unit 420 analyzes the data collected by the data collection unit 410 and estimates the flow of air (airflow) in the space where the communication module group 200G is installed. The dust estimation unit 430 estimates the distribution of dust in the space according to the result of the estimation by the airflow estimation unit 420.

The affected point determination unit 440 determines whether there is a point in the space where an airflow or dust may affect an article being managed based on the estimation result of the airflow estimation unit 420 and the dust estimation unit 430. When the corresponding point exists, the affected point determination unit 440 specifies the corresponding point and outputs information related to the corresponding point by the output unit 450.

The output unit 450 outputs the estimation result by the airflow estimation unit 420 and the estimation result by the dust estimation unit 430. The output unit 450 outputs information related to the point specified by the affected point determination unit 440. An output destination of the output unit 450 may be, for example, a terminal apparatus 500 or a display or the like included in the information processing apparatus 400.

Sensor position information 465 is stored in the storage unit 460. When the communication module group 200G is installed, the sensor position information 465 is input to the information processing apparatus 400 in advance and stored in the storage unit 460.

The sensor position information 465 is information in which identification information for identifying each communication module 200 and information indicating a position where each communication module 200 is installed are associated with each other. The position where the communication module 200 is installed may be three-dimensional coordinate information.

Figure 8:
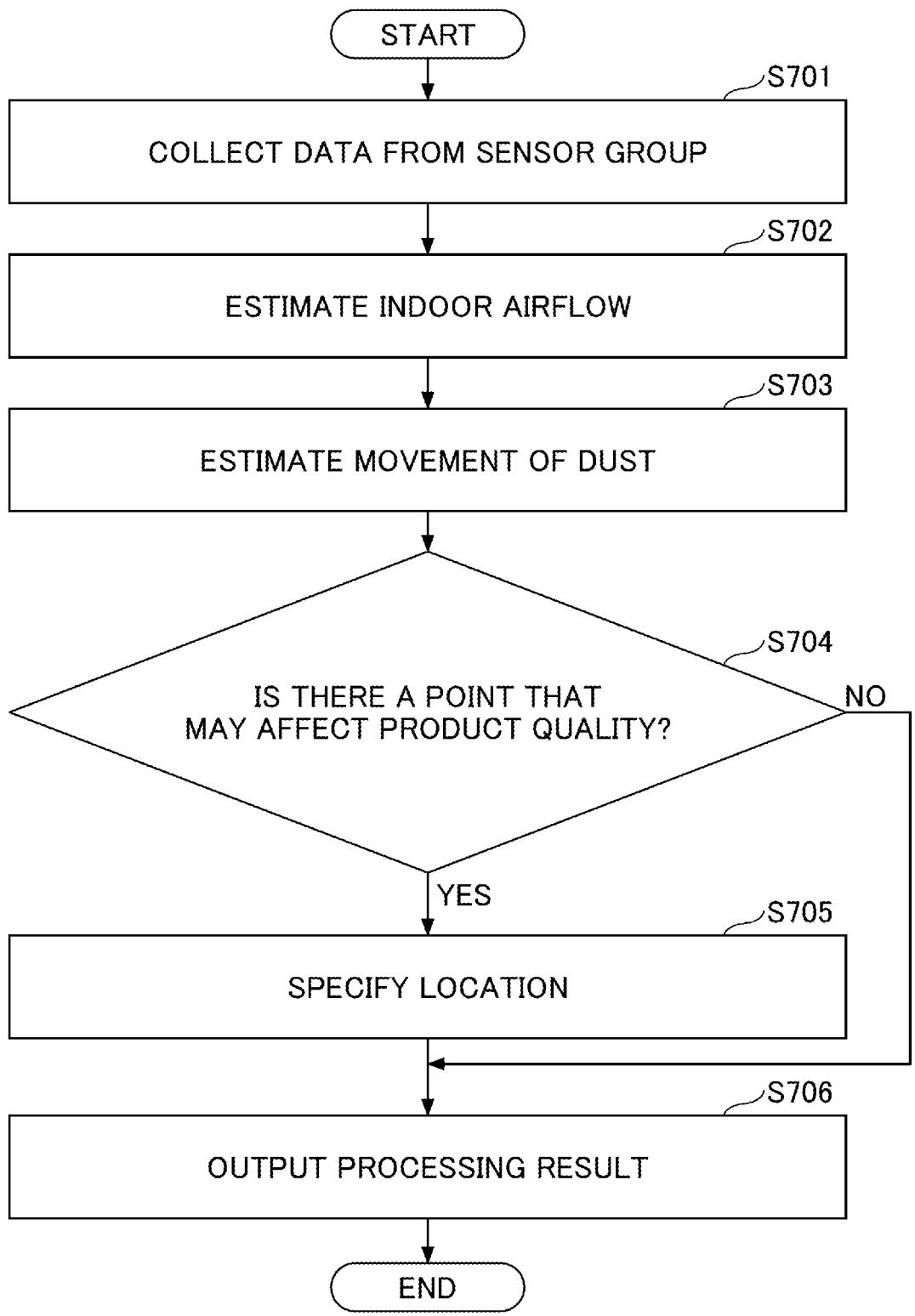
FIG. 8 is a flowchart illustrating an operation of the information processing apparatus according to the first embodiment.

Next, an operation of the information processing apparatus 400 according to the present embodiment will be described with reference to FIG. 8. FIG. 8 is a flowchart illustrating an operation of the information processing apparatus according to the first embodiment.

The information processing apparatus 400 according to the present embodiment collects data from the communication module group 200G by the data collection unit 410 (step S701).

Specifically, the information processing apparatus 400 sends an instruction to the communication terminal 300 to collect data. The communication terminal 300 may accept the instruction and may transmit a command that instructs the communication module 200 located nearest to the communication terminal 300 to collect data.

The data collected by the data collection unit 410 includes at least a wind direction (flow direction) and a wind velocity (flow velocity) detected by the airflow sensor 210 of each communication module 200, and identification information for specifying each communication module 200. The data collected by the data collection unit 410 may include data detected by each sensor of the body portion 220 of the communication module 200.

Subsequently, the information processing apparatus 400 analyzes the data collected by the data collection unit 410 by the airflow estimation unit 420 referring to the sensor position information 465 and estimates the airflow in the space where the communication module group 200G is installed (step S702). In other words, the airflow estimation unit 420 analyzes the data collected by the data collection unit 410 and generates information for visualizing the airflow.

Subsequently, the information processing apparatus 400 estimates the movement of dust in the space from the result of the estimation by the dust estimation unit 430 with the airflow estimation unit 420 (step S703). In other words, the dust estimation unit 430 generates information to visualize the state of dust dispersion caused by the estimated airflow.

Subsequently, the information processing apparatus 400 determines whether there is a point that may affect the article being managed by the affected point determination unit 440 (step S704). Specifically, the affected point determination unit 440 may determine a point where a certain amount or more of dust is retained as a point that may affect the article being managed. The article being managed may be, for example, a product manufactured in the space, or a plant cultivated in the space.

In step S704, when a corresponding point exists, the affected point determination unit 440 specifies the corresponding location (step S705) and proceeds to step S706, which will be described later.

In step S704, when the corresponding point does not exist, the information processing apparatus 400 outputs the processing result by the output unit 450 (step S706) and ends the processing.

The output unit 450 may individually output the processing result of the data collection unit 410, the processing result of the airflow estimation unit 420, and the processing result of the dust estimation unit 430 and the affected point determination unit 440.

Next, an example of the output of the processing result of the present embodiment will be described with reference to FIG. 9. FIG. 9 is a diagram illustrating an output example of the processing result of the first embodiment.

A screen 81 illustrated in FIG. 9, a screen 82 illustrated in FIG. 9, and a screen 83 illustrated in FIG. 9 may be displayed on the terminal apparatus 500 or on the display of the information processing apparatus 400.

The screen 81 is displayed in a state where the wind direction at each point in the space where the communication module group 200G is installed is visualized from the data collected by the data collection unit 410. Specifically, the wind direction at each point is indicated by the direction of the arrow displayed on the screen 81.

The screen 82 is displayed in a state where the airflow estimated by the airflow estimation unit 420 is visualized. On the screen 82, a solid line 82A that indicates the airflow is displayed.

The screen 83 is displayed in a state where the dust movement estimated by the dust estimation unit 430 and the point specified by the affected point determination unit 440 are visualized.

On the screen 83, the dust is displayed as a point 83B, and the point specified by the affected point determination unit 440 is surrounded by a marker 83C.

In the example of FIG. 9, on the screen 82, there is a point where the airflow is swirling near the center of the space, and the dust carried to this point is expected to remain.

Accordingly, the administrator of the space may take such measures as changing the wind direction and the wind velocity of the air conditioning in the space or frequently cleaning the point indicated by the marker 83C on the screen 83.

In the information processing apparatus 400 according to the present embodiment, a screen to be displayed may be selected from the screens 82, 83, and 84.

Figure 10A:
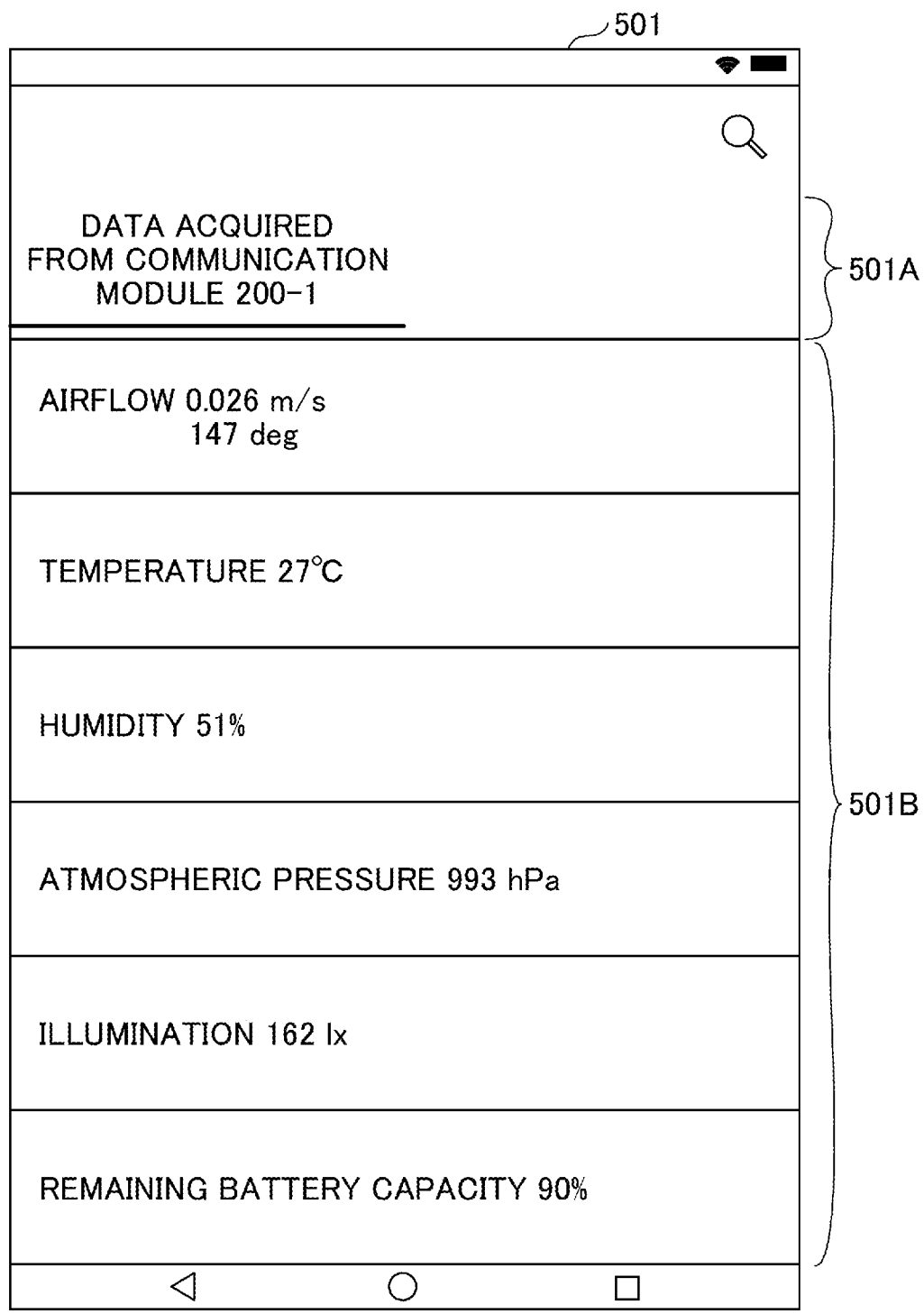
FIG. 10A is a first diagram illustrating an output example of data collected from the communication module according to the first embodiment.

Next, the output of the data collected by the data collection unit 410 will be described with reference to FIG. 10A and FIG. 10B. FIG. 10A is a first diagram illustrating an example of an output of the data collected from the communication module according to the first embodiment, and FIG. 10B is a second diagram illustrating an example of an output of the data collected from the communication module according to the first embodiment.

Figure 10B:
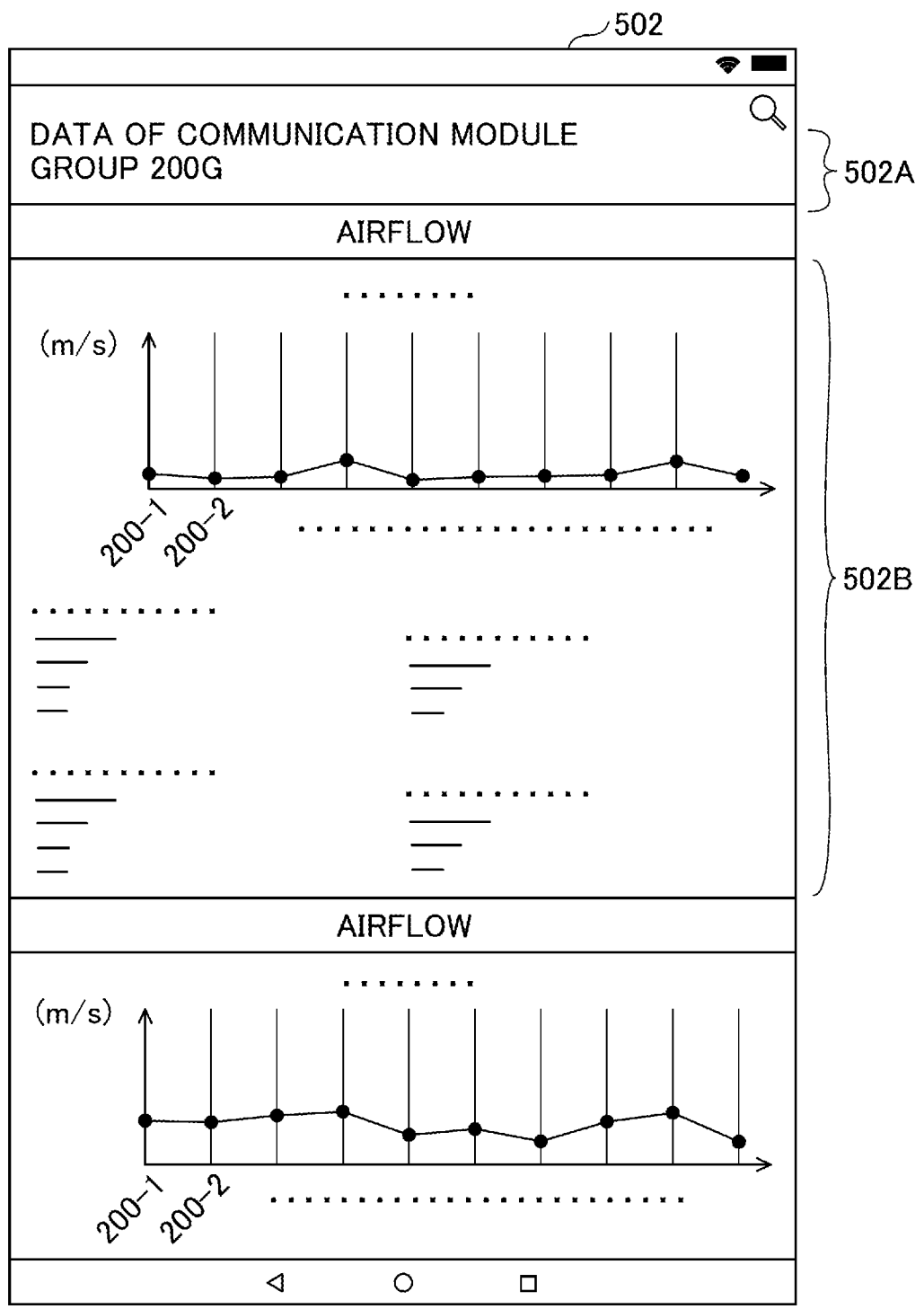
FIG. 10B is a second diagram illustrating an output example of data collected from the communication module according to the first embodiment.

The screen 501 illustrated in FIG. 10A and a screen 502 illustrated in FIG. 10B are, for example, displayed on the terminal apparatus 500. The screen 501 is a display example of the data collected from a certain communication module 200 included in the communication module group 200G, and the screen 502 is a display example of the result of totaling the data collected from the communication module group 200G.

The screen 501 includes a display field 501A and a display field 501B. In the display field 501A, information specifying the communication module 200 in which the data is displayed is displayed. In the display field 501B, the data acquired from the communication module 200 in display field 501A is displayed.

In the example of FIG. 10A, the information such as "Data acquired from communication module 200-1" is displayed in the display field 501A, and data acquired from each sensor included in the communication module 200-1 among the communication modules 200 included in the communication module group 200G is displayed in the display field 501B.

Specifically, the airflow (wind velocity, wind direction), temperature, humidity, atmospheric pressure, illuminance, and the remaining battery capacity are displayed in the display field 501B.

The screen 502 includes a display field 502A and a display field 502B. In the display field 502A, information indicating that the data is collected from the communication module group 200G is displayed. In the display field 502B, the data collected from the communication module group 200G is displayed.

In the example of FIG. 10B, the information such as "Data collected from communication module group 200G" is displayed in the display field 502A, and a graph made from the data collected from the airflow sensor 210 of each communication module 200 included in the communication module group 200G is displayed in the display field 502B.

The information processing apparatus 400 according to the present embodiment may display the screen 501 or the screen 502 on the terminal apparatus 500 when, for example, a display request of the data acquired from the specific communication module 200 or the data acquired from the communication module group 200G is received from the terminal apparatus 500.

The screens illustrated in FIG. 10A and FIG. 10B are displayed on the terminal apparatus 500, but the present invention is not limited to this configuration. The screens illustrated in FIG. 10A and FIG. 10B may be displayed on a display or the like of the information processing apparatus 400.

As described above, according to the present embodiment, the data output by each sensor included in the communication module 200 can be collected by wireless communication from the communication module 200 set at any position. Accordingly, according to the present embodiment, the airflow can be easily measured.

Further, in the present embodiment, data is collected from each communication module 200 by the mesh network. That is, according to the present embodiment, even when a communication module 200 and the other communication module 200 are set in different rooms, data output from each communication module 200 can be transferred to the communication terminal 300. Therefore, according to the present embodiment, the communication module 200 can be installed in any location without being affected by the structure of the space or the like.

Second Embodiment

A second embodiment will be described below with reference to the drawings. The second embodiment differs from the first embodiment in that data collected from the communication module group 200G is analyzed by the server apparatus. Therefore, in the following description of the second embodiment, the differences from the first embodiment will be described. Those having the same functional configuration as that of the first embodiment are given the same reference numerals as those used in the description of the first embodiment, and the description thereof will be omitted.

Figure 11:
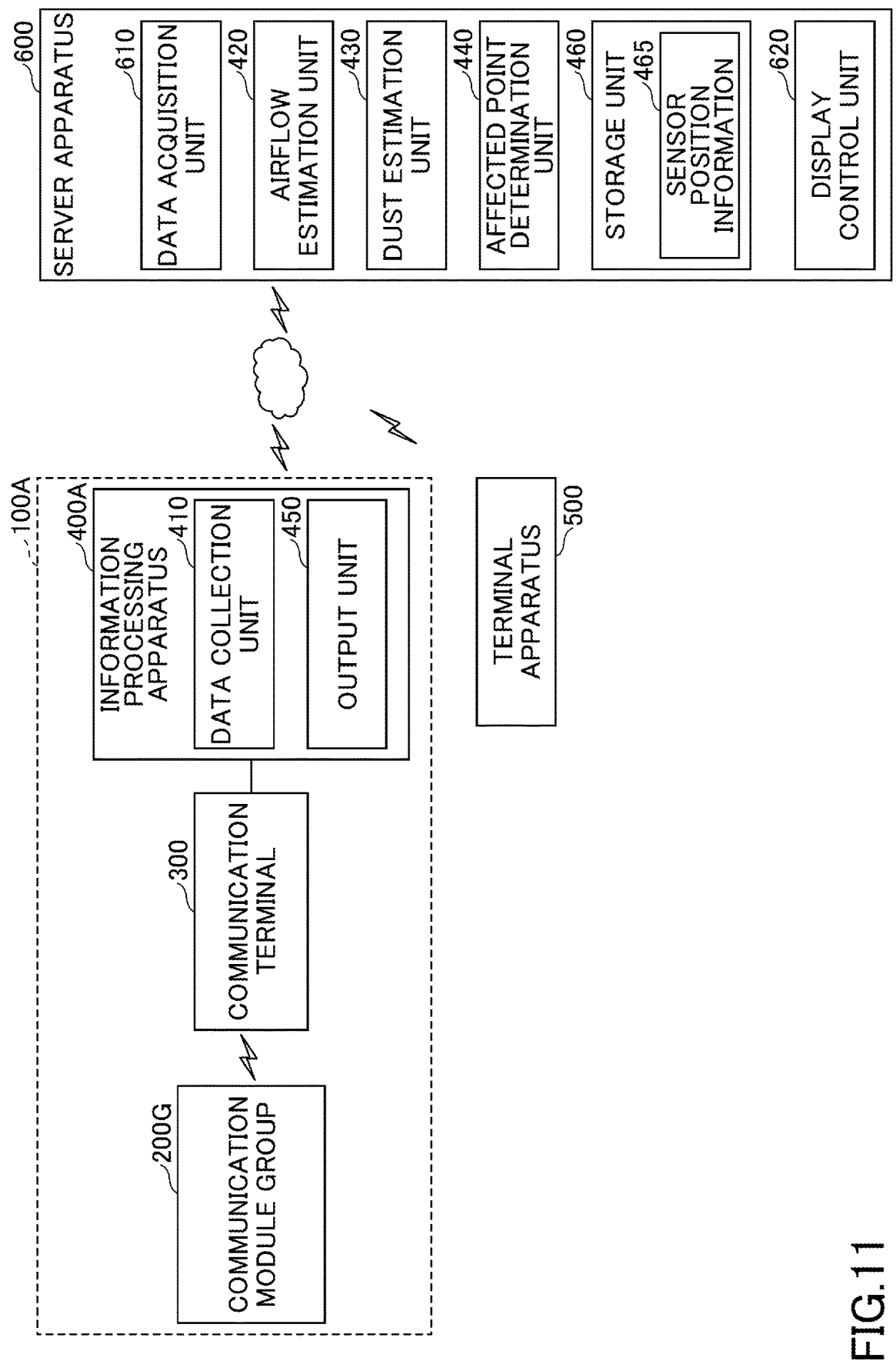
FIG. 11 is a diagram illustrating a system configuration of an airflow measurement system according to a second embodiment.

FIG. 11 is a diagram illustrating a system configuration of an airflow measurement system according to the second embodiment.

An airflow measurement system 100A according to the present embodiment includes a communication module group 200G, a communication terminal 300, and an information processing apparatus 400A.

Further, in the airflow measurement system 100A according to the present embodiment, the information processing apparatus 400A is connected to a server apparatus 600 and a terminal apparatus 500 via a network.

The information processing apparatus 400A according to the present embodiment includes a data collection unit 410 and an output unit 450. The information processing apparatus 400A according to the present embodiment collects data from the communication module group 200G by the data collection unit 410, and the output unit 450 outputs the collected data to the server apparatus 600. The output unit 450 may output collected data to the terminal apparatus 500.

The server apparatus 600 according to the present embodiment includes a data acquisition unit 610, an airflow estimation unit 420, a dust estimation unit 430, an affected point determination unit 440, a storage unit 460, and a display control unit 620.

The data acquisition unit 610 acquires data collected by the information processing apparatus 400A from the information processing apparatus 400A. The display control unit 620 displays the result of the processing by the airflow estimation unit 420, the dust estimation unit 430, and the affected point determination unit 440 on a display of the information processing apparatus 400A or the terminal apparatus 500.

In the present embodiment, a processing load of the information processing apparatus 400A can be reduced by causing the server apparatus 600 to perform the analysis processing of the data collected from the communication module group 200G.

Third Embodiment

A third embodiment will now be described with reference to the drawings. The third embodiment differs from the first embodiment in that sensor position information is generated. Therefore, in the following description of the third embodiment, the differences from the first embodiment will be described. Those having the same functional configuration as that of the first embodiment are given the same reference numerals as those used in the description of the first embodiment, and the description thereof will be omitted.

Figure 12:
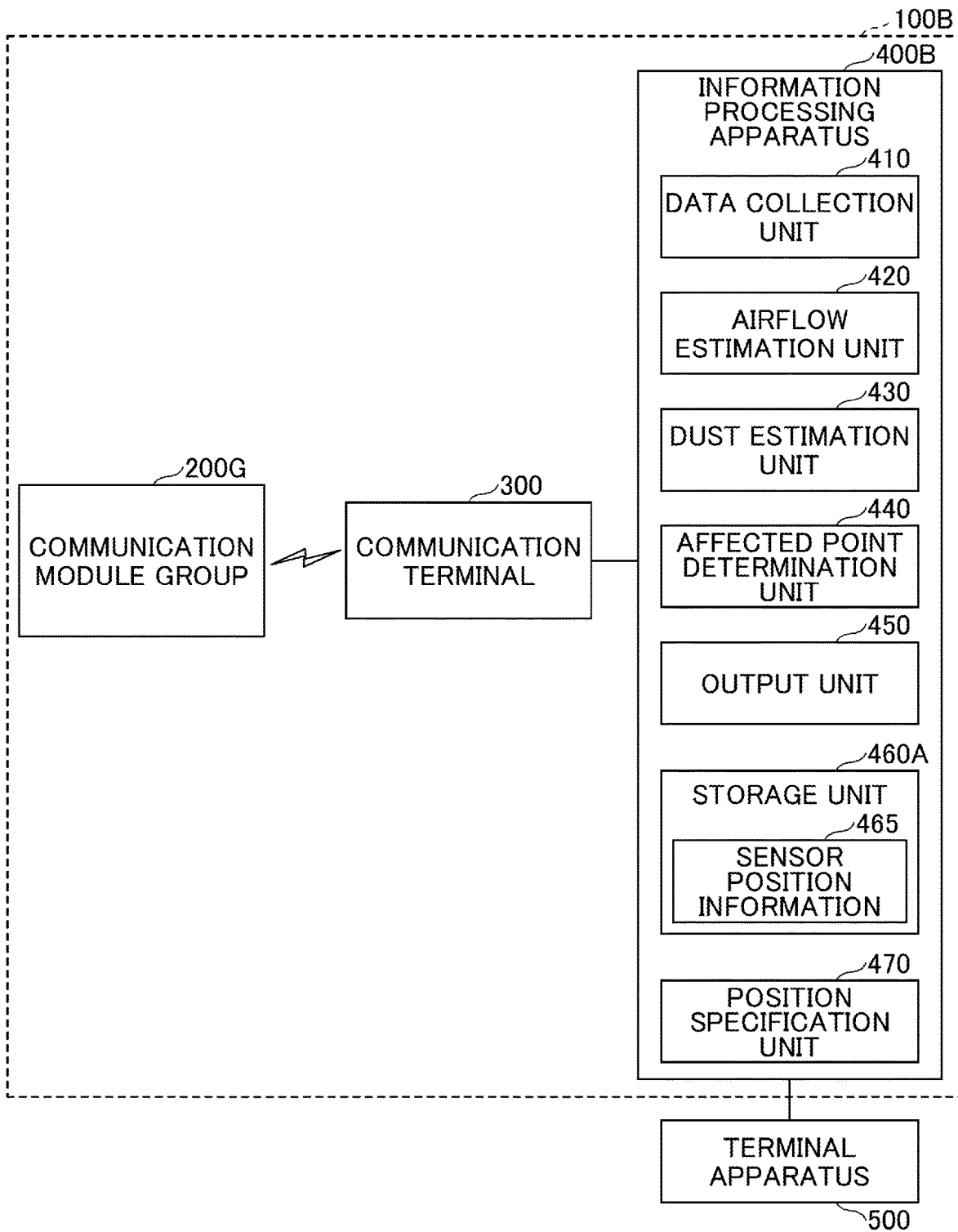
FIG. 12 is a diagram illustrating a function of an information processing apparatus according to a third embodiment.

FIG. 12 is a diagram illustrating a function of an information processing apparatus according to the third embodiment. An information processing apparatus 400B according to the present embodiment is included in an airflow measurement system 100B.

The airflow measurement system 100B includes a communication module group 200G, a communication terminal 300, and the information processing apparatus 400B.

The information processing apparatus 400B according to the present embodiment includes a data collection unit 410, an airflow estimation unit 420, a dust estimation unit 430, an affected point determination unit 440, an output unit 450, a storage unit 460A, and a position estimation unit 470.

The position estimation unit 470 according to the present embodiment collects data from the communication module group 200G for a certain period of time by the data collection unit 410 and estimates the relative positional relationship of each communication module 200 based on the collected data. Then, the position estimation unit 470 generates sensor position information 465 in which the communication module 200 and the position information indicating the estimated position are associated with each other based on the estimated positional relationship, and stores the sensor position information 465 in the storage unit 460A.

More specifically, the position estimation unit 470 determines a distance between the communication modules 200 from the signal strength at the time of the communication terminal 300 receiving data from each communication module 200. Then, the position estimation unit 470 estimates the position of each communication module 200 with reference to the position where the communication terminal 300 is installed, and generates sensor position information.

In the present embodiment, since the sensor position information is generated from the signal strength when the communication terminal 300 receives the data, the sensor position information is not required to be stored in the information processing apparatus 400B in advance. That is, according to the present embodiment, when each communication module 200 is installed, the position information of the communication module 200 is not required to be input to the information processing apparatus 400, and thus the airflow measurement system 100B can be easily introduced.

Fourth Example

A fourth embodiment will be described below with reference to the drawings. The fourth embodiment differs from the first embodiment in that a communication module 200 is positioned in proximity to the particle counter. Therefore, in the following description of the fourth embodiment, the differences from the first embodiment will be described. Those having the same functional configuration as that of the first embodiment are given the same reference numerals as those used in the description of the first embodiment, and the description thereof will be omitted.

Figure 13:
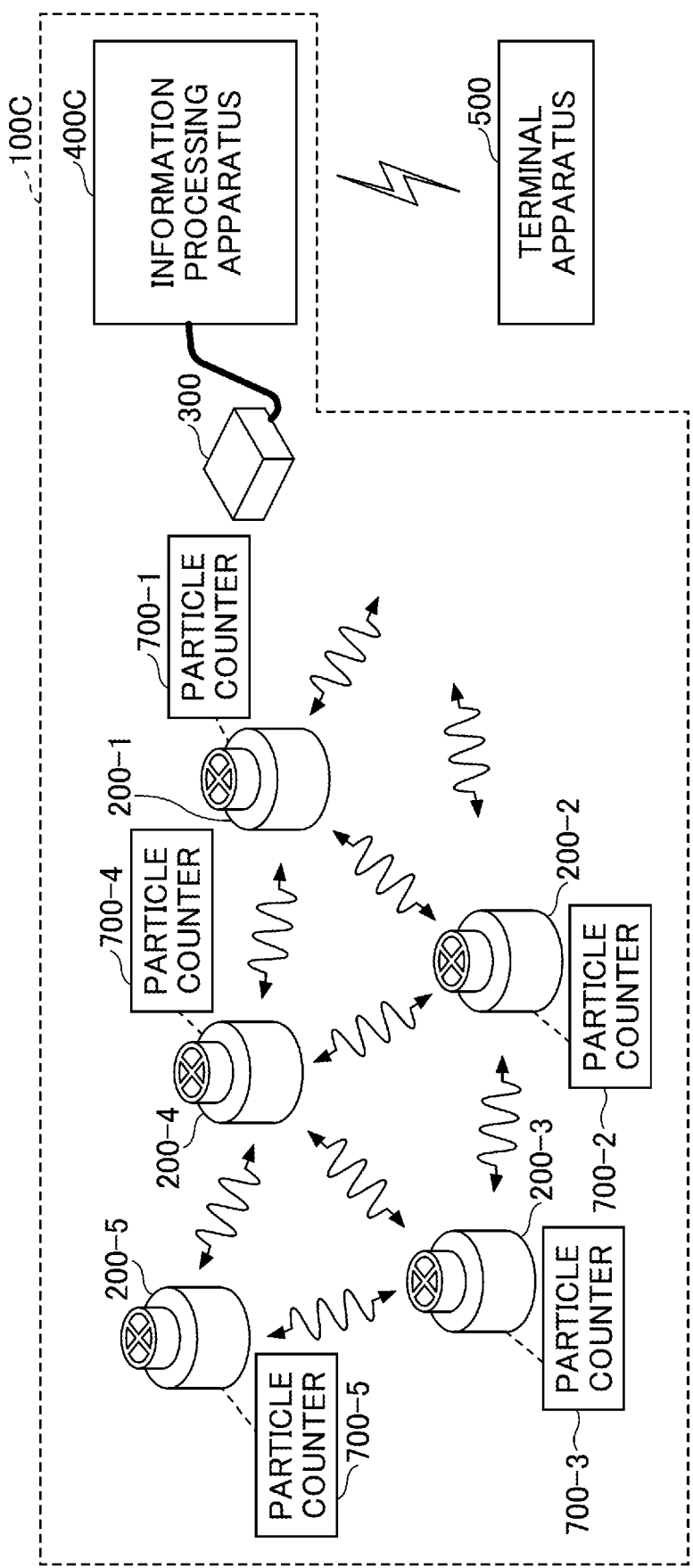
FIG. 13 is a diagram illustrating a system configuration of an airflow measurement system according to a fourth embodiment.

FIG. 13 is a diagram illustrating a system configuration of an airflow measurement system according to the fourth embodiment. An airflow measurement system 100C according to the present embodiment includes a communication module group 200G, a particle counter 700 located in proximity to each communication module 200 included in the communication module group 200G, a communication terminal 300, and an information processing apparatus 400C.

The particle counter 700 includes particle counters 700-1, 700-2, 700-3, 700-4, and 700-5. When each of the particle counters 700-1, 700-2, 700-3, 700-4, and 700-5 is not distinguished, the particle counters are referred to as the particle counter 700. Further, the plurality of particle counters 700 are referred to as a particle counter group 700G.

The particle counter 700 according to the present embodiment is a measuring instrument that counts dust, dirt, foreign matter, powder, or the like, present in the air or liquid and is also referred to as a particulate matter sensor.

In the present embodiment, the communication module 200 is located in proximity to the particle counter 700. Specifically, the communication module 200 may be mounted on a housing or the like of the particle counter 700.

The particle counter 700 in the present embodiment outputs the number of particles in the space. Further, the particle counter 700 of the present embodiment also communicates with the communication module 200 to inform the communication module 200 of the number of particles counted.

The communication module 200 transmits the number of particles obtained from the particle counter 700 to the communication terminal 300 together with the data output from each sensor included in the communication module 200.

Figure 14:
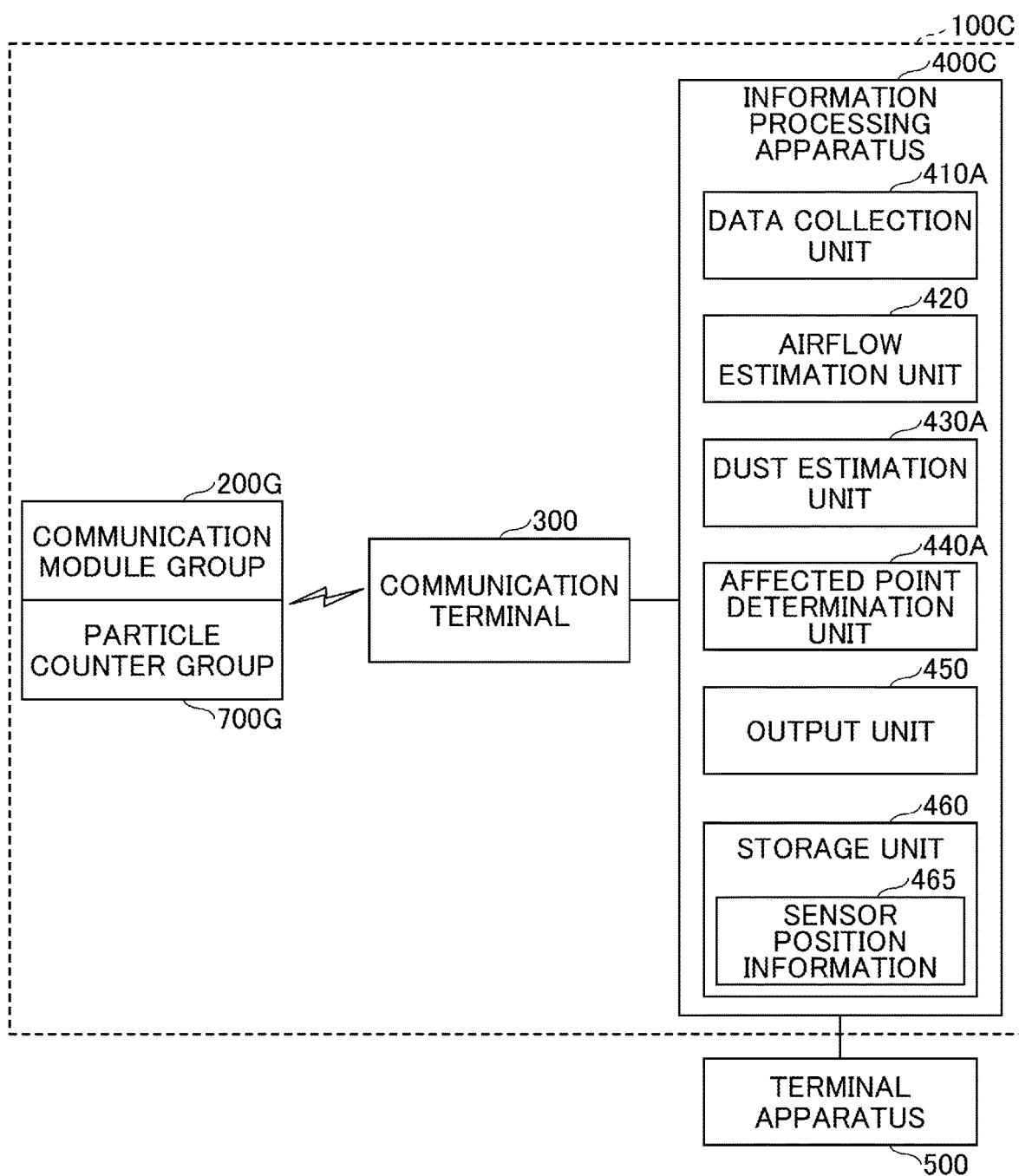
FIG. 14 is a diagram illustrating a function of the information processing apparatus according to the fourth embodiment.

FIG. 14 is a diagram illustrating a function of the information processing apparatus according to the fourth embodiment. An information processing apparatus 400C according to the present embodiment includes a data collection unit 410A, an airflow estimation unit 420, a dust estimation unit 430A, an affected point determination unit 440A, an output unit 450, and a storage unit 460.

The communication terminal 300 according to the present embodiment receives, from the communication module group 200G, data including the number of particles output from the particle counter 700 disposed in proximity to each communication module 200.

The data collection unit 410A according to the present embodiment collects data including the number of particles output from the particle counter 700 from the communication terminal 300.

The dust estimation unit 430A of the present embodiment estimates the movement of dust based on the number of particles output from the particle counter 700.

The affected point determination unit 440A according to the present embodiment determines whether there is a point where airflow or dust may affect the article according to the number of particles output from the particle counter 700.

Specifically, the affected point determination unit 440A may, for example, determine that a point where the particle counter 700 that has detected a predetermined number or more of particles is installed is a point where airflow or dust may affect the article.

In this manner, in the present embodiment, the particle counter 700 and the communication module 200 are connected, and the output of the particle counter 700 is also transferred to the communication terminal 300 via the communication module 200 thereby improving the accuracy of estimating the movement of dust.

In each of the above-described embodiments, the airflow measurement system is configured to transfer data using a mesh network, but the present invention is not limited to this configuration.

In the present embodiment, for example, data output from each sensor may be transmitted from the communication module 200 to the communication terminal 300 at regular intervals.

Figure 15:
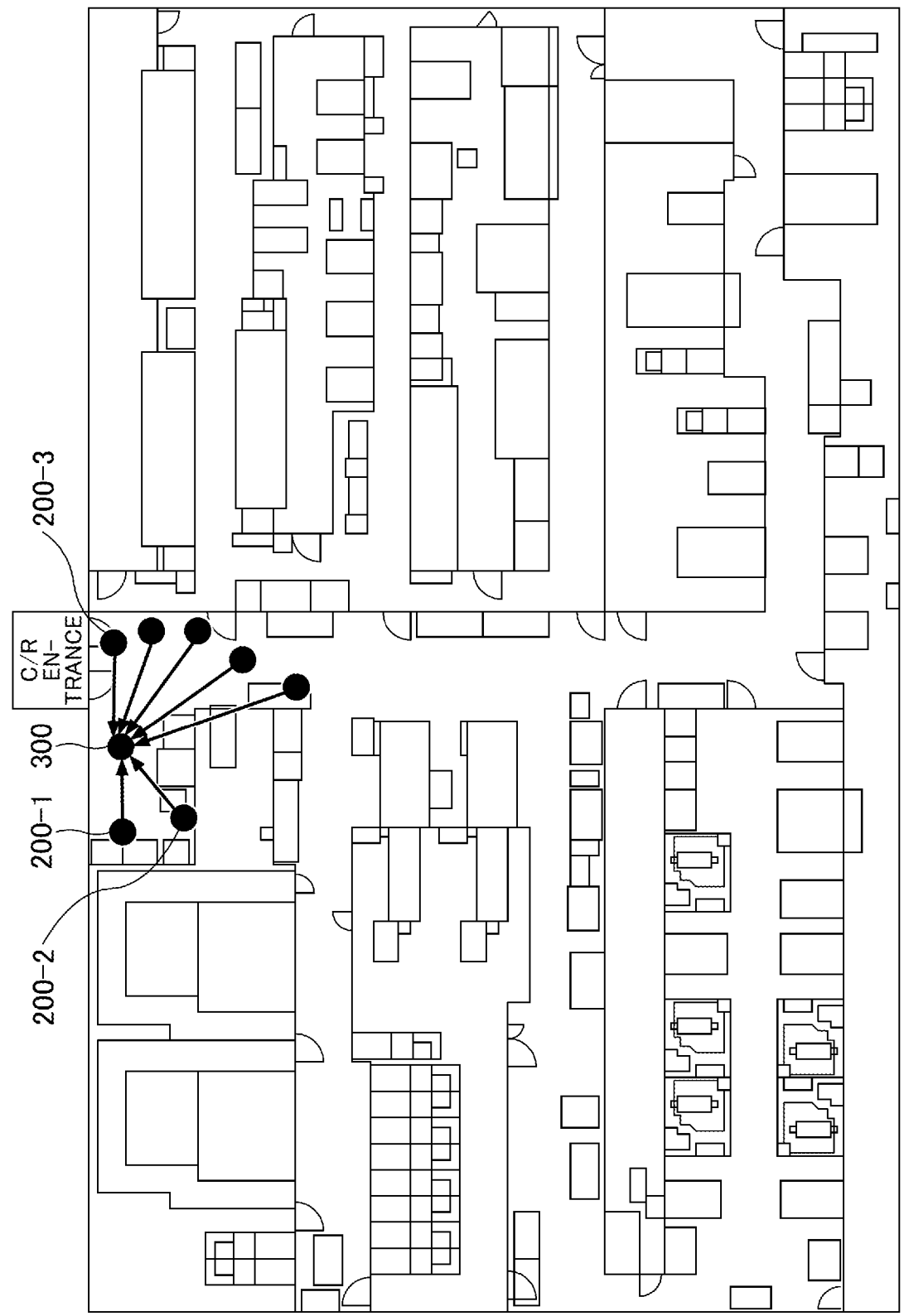
FIG. 15 is a diagram illustrating an arrangement of communication modules.

FIG. 15 is a diagram illustrating an arrangement of the communication modules. In the example of FIG. 15, each of the communication modules 200-1, 200-2, 200-3, and the like periodically transmits a signal to the communication terminal 300. The signal includes the data output from the sensor and the identification information of the own device.

This configuration may be applied, for example, when the communication terminal 300 and the communication module 200 are in the same room.

In each of the above-described embodiments, the case where the airflow measurement system 100 is used in a cleanroom or the like provided in the semiconductor integrated circuit manufacturing plant or the like has been described, but the airflow measurement system may be used in a room other than the cleanroom.

Specifically, for example, the airflow measurement system 100 can be used in a negative pressure room provided in a medical institution or the like. Hereinafter, an example in which the airflow measurement system 100 is used in the negative pressure room will be described with reference to FIG. 16. The negative pressure room is a room in which the atmospheric pressure in the room is lower than that in the outside so that the air in the room does not flow out to the outside.

Figure 16:
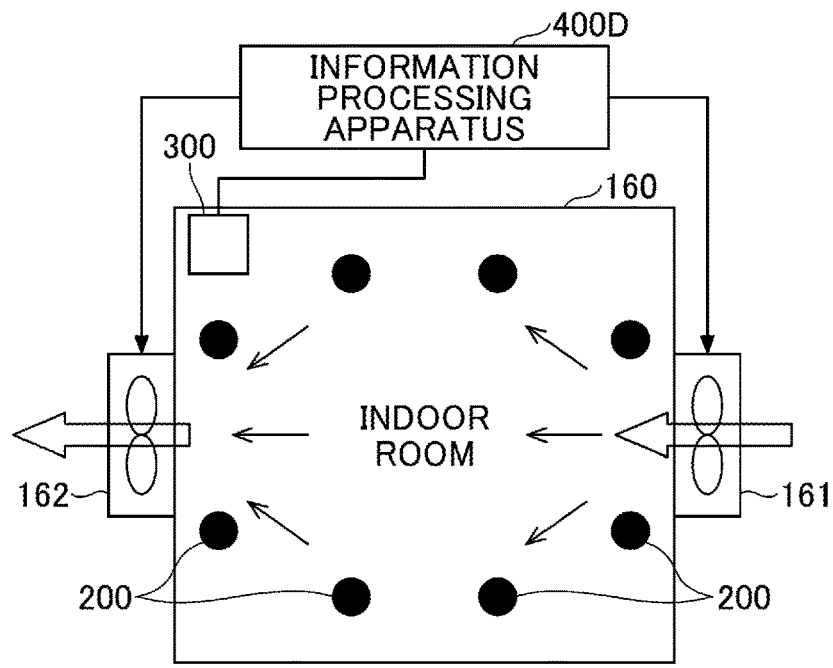
FIG. 16 is a second diagram illustrating a scenario in which the airflow measurement system is in use.

FIG. 16 is a second diagram illustrating according to the present embodiment. A negative pressure room 160 illustrated in FIG. 16 is provided with an air supply fan 161 and an air exhaust fan 162, and controls the air supply fan 161 and the air exhaust fan 162 to bring the room into a negative pressure state or a positive pressure state.

Specifically, in the negative pressure room 160, the room is brought into a negative pressure state by controlling the air supply fan 161 and the air exhaust fan 162 such that the exhaust amount becomes larger than the supply air amount.

Further, in the negative pressure room 160, the room is brought into a positive pressure state by controlling the air supply fan 161 and the air exhaust fan 162 such that the exhaust amount becomes smaller than the supply amount.

In the present embodiment, for example, a plurality of communication modules 200 are installed in the negative pressure room 160, and each communication module 200 detects the wind direction or wind velocity in proximity to the air supply fan 161 and the wind direction or wind velocity in proximity to the air exhaust fan 162.

Each communication module 200 transmits the detected result to the communication terminal 300. The communication terminal 300 transmits the detection result collected from each communication module 200 to the information processing apparatus 400. The information processing apparatus 400 grasps the supply air amount and the exhaust air amount from the detection result received from the communication terminal 300.

Then, the information processing apparatus 400 determines that the air supply and exhaust are normal if the air supply and exhaust are carried out according to the objective amount. If either the air supply amount or the air exhaust amount is different from the objective amount, the information processing apparatus 400 determines that the negative pressure state is not maintained in the negative pressure room 160, and outputs an alert. The alert may be, for example, an alert notifying deterioration of the filter of the negative pressure room 160.

In this way, the state inside the negative pressure room 160 can be monitored by using the airflow measurement system 100 of the present embodiment.

Further, the airflow measurement system 100 of the present embodiment can be used in an office, a store, or the like. Hereinafter, an example in which the airflow measurement system 100 is used in the office will be described with reference to FIG. 17.

Figure 17:
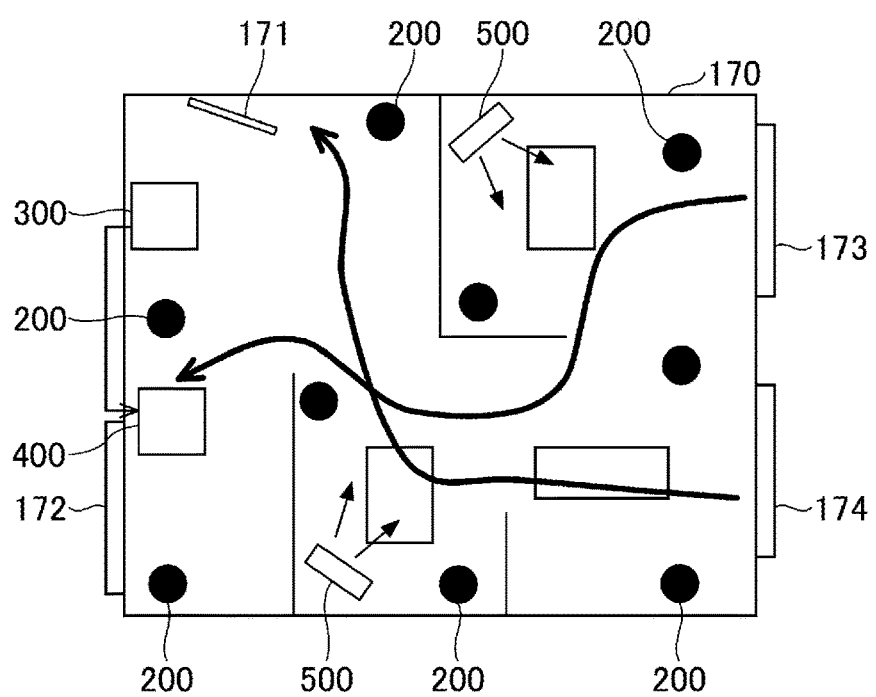
FIG. 17 is a third diagram illustrating a scenario in which the airflow measurement system is in use.

FIG. 17 is a third diagram illustrating according to the present embodiment. In an office 170 illustrated in FIG. 17, a partition, a wall, a desk, an Office Automatic (OA) device, and the like are arranged. Further, the office 170 is provided with a door 171 and windows 172, 173, and 174, and ventilation in the office 170 is performed by opening and closing the door 171 and windows 172, 173, and 174.

In the example of FIG. 17, by disposing communication modules 200 in various places in each area, the wind direction or wind velocity of the air flowing into the office 170 from the windows 173 and 174 and the wind direction or wind velocity of the air flowing out of the office 170 from the door 171 and the window 172 are detected. The detection result is transmitted to the communication terminal 300.

The communication terminal 300 transmits the detection result collected from each communication module 200 to the information processing apparatus 400.

The information processing apparatus 400 determines whether the office 170 is sufficiently ventilated from the detection result received from the communication terminal 300.

Then, when it is determined that the ventilation is insufficient, the information processing apparatus 400 may output an alert prompting the layout change in the office 170, may operate a fan 500, or the like.

Further, the information processing apparatus 400 may accept the setting of the airflow at the time of ventilation, and may determine that the ventilation is insufficient when the airflow does not flow in the set direction. Further, the information processing apparatus 400 may output an alert notifying the forgetting of ventilation, for example, when the airflow in the set direction is not detected for a certain period of time.

As described above, by using the airflow measurement system 100 of the present embodiment indoors in the office 170 or the like, it is possible to prevent forgetting to ventilate the room.

Further, the airflow measurement system 100 of the present embodiment may be used in a house or the like. Hereinafter, an example in which the airflow measurement system 100 is used in a house will be described with reference to FIG. 18.

Figure 18:
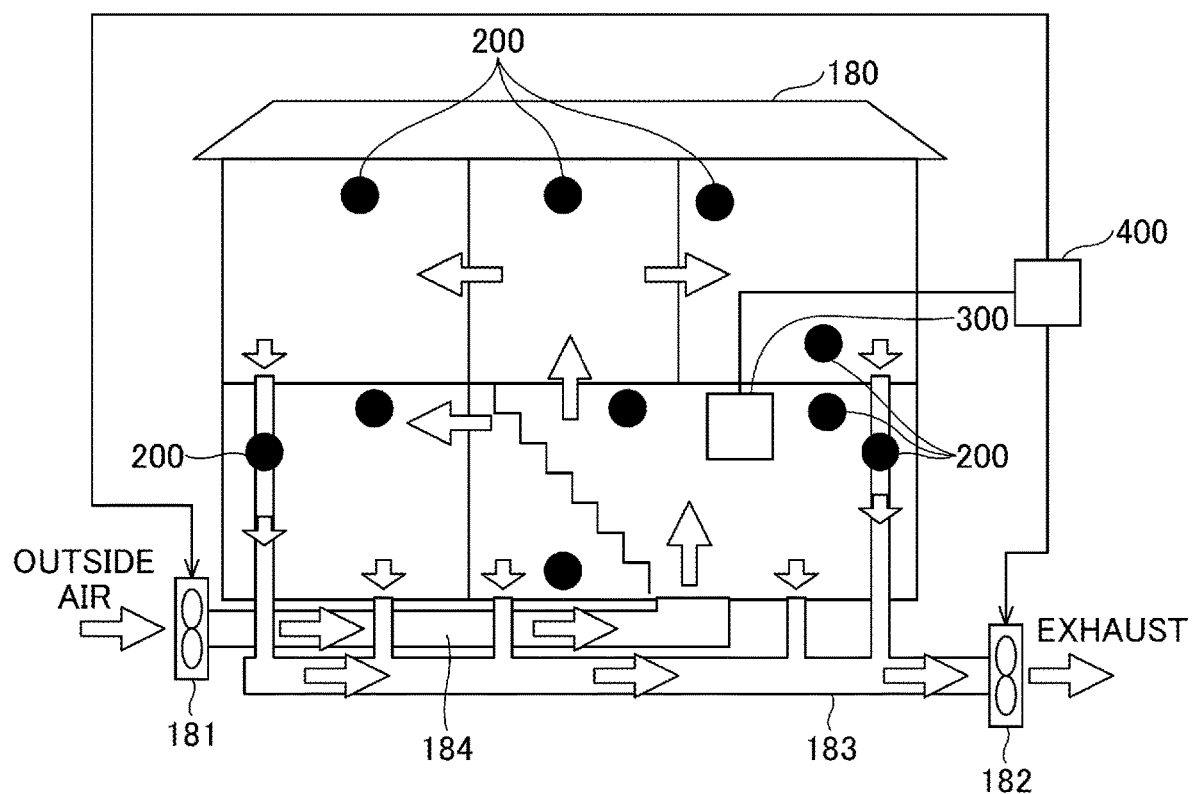
FIG. 18 is a fourth diagram illustrating a scenario in which the airflow measurement system is in use.

FIG. 18 is a fourth diagram illustrating according to the present embodiment.

A house 180 illustrated in FIG. 18 includes a fan 181 installed outdoors to take in outside air and a fan 182 to exhaust the air inside the house 180 to the outside.

In the house 180, the fan 181 installed outdoors is operated to take in the outside air indoors, and dust and pollen from the outside are removed by a filter provided inside the fan 181, and the air is drawn into the house 180 via a pipe 184 or the like.

The air sent into the house 180 is exhausted to the outside by rotating the fan 182 via a pipe 183 or the like arranged in the house 180.

In the example of FIG. 18, communication modules 200 are installed in each room, and each communication module 200 detects the wind direction or the wind velocity of the installed room and transmits the detection result to the communication terminal 300. The communication terminal 300 transmits the detection result collected from each communication module 200 to the information processing apparatus 400.

For example, when the wind direction or the wind velocity detected in each room is below a predetermined value, the information processing apparatus 400 determines that ventilation is not efficiently performed, and operates the fan 181 to draw in the outside air. Alternatively, the fan 182 is operated to exhaust the indoor air to the outside.

As described above, by using the airflow measurement system 100 of the present embodiment in the house 180 or the like, it is possible to efficiently ventilate the room.

Further, in the present embodiment, for example, the communication terminal 300 may be provided with the function of the information processing apparatus 400. Further, the communication terminal 300 may be, for example, a smartphone or the like.

In this case, a user of the communication terminal 300 wears the communication module 200, so that the communication terminal 300 can estimate the degree of diffusion based on the wind direction or the wind velocity of the exhaled breath detected by the communication module 200. Therefore, the airflow measurement system 100 including the communication terminal 300 and the communication module 200 can inform the user of the communication terminal 300 of a safe distance against the spread of droplets containing viruses and the like, which can be useful for infection prevention.

The present international application is based on and claims priority to Japanese Patent Application No. 2019-150833 filed on Aug. 21, 2019, with the Japanese Patent Office, the entire contents of which are hereby incorporated by reference.

DESCRIPTION OF SYMBOLS 100, 100A, 100B, 100C airflow measurement system
200 communication module 210 airflow sensor
220 body portion
300 communication terminal
400, 400A, 400B, 400C information processing apparatus
410, 410A data collection unit
420 airflow estimation unit
430, 430A dust estimation unit
440, 440A affected point determination unit
450 output unit
460 storage unit
465 sensor position information
470 position estimation unit
500 terminal apparatus
600 server apparatus

The invention claimed is:

1. An airflow measurement system comprising:
a plurality of communication modules; and
an information processing apparatus,
wherein the communication module includes an airflow sensor, and a body portion including a processing circuit configured to acquire data output from the airflow sensor and transmit the data to outside by wireless communication, and,
wherein the information processing apparatus includes a memory and a processor configured to collect the data output from the airflow sensor of the plurality of communication modules, and output the collected data,
wherein the plurality of communication modules and the information processing apparatus communicate with each other via a communication terminal, and
wherein the plurality of communication modules and the communication terminal communicate with each other using a mesh network.

2. The airflow measurement system according to claim 1, wherein the processor is further configured to estimate a state of an airflow in a space where the plurality of communication modules are disposed, the airflow being estimated based on the collected data.

3. The airflow measurement system according to claim 2, wherein the processor is further configured to estimate movement of dust in the space where the plurality of communication modules are disposed based on the collected data.

4. The airflow measurement system according to claim 3, wherein the communication module is disposed in proximity to a particulate matter sensor, acquires a measurement result measured by the particulate matter sensor, and transmits the measurement result, to the information processing apparatus, together with the data output from the airflow sensor.

5. The airflow measurement system according to claim 4, wherein the processor displays the estimated airflow and the estimated dust movement on a display device.

6. A communication module comprising:
an airflow sensor; and
a body portion including a processing circuit configured to acquire data output from the airflow sensor and transmit the data to outside by wireless communication,
wherein the communication module is configured to communicate with an information processing apparatus via a communication terminal, and
wherein the communication module is configured to communicate with the communication terminal using a mesh network.

7. The communication module according to claim 6, wherein the body portion includes at least one of a temperature sensor, a humidity sensor, an acceleration sensor, an illuminance sensor, and an ultraviolet sensor.

8. The communication module according to claim 6, wherein the airflow sensor detects a flow direction or a flow velocity of air in a space where the communication module is installed.

9. An airflow measurement system comprising:
a plurality of communication modules; and
an information processing apparatus,
wherein the communication module includes an airflow sensor, and a body portion including a processing circuit configured to acquire data output from the airflow sensor and transmit the data to outside by wireless communication, and,
wherein the information processing apparatus includes a memory and a processor configured to collect the data output from the airflow sensor of the plurality of communication modules, and output the collected data,
wherein the communication module is disposed in proximity to a particulate matter sensor, acquires a measurement result measured by the particulate matter sensor, and transmits the measurement result, to the information processing apparatus, together with the data output from the airflow sensor.

* * * * *